Figure 1:
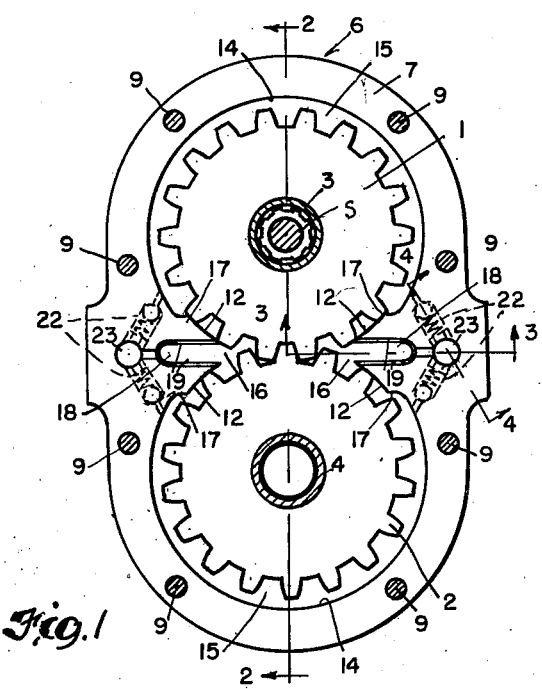

May 26, 1953   J. P. JOHNSON   2,639,694
GEAR MOTOR OR PUMP
Filed April 12, 1949

INVENTOR.
JAMES P. JOHNSON
BY
Oberlin & Limbach
ATTORNEYS.

Patented May 26, 1953

2,639,694

UNITED STATES PATENT OFFICE 2,639,694

GEAR MOTOR OR PUMP

James F. Johnson, Shaker Heights, Ohio

Application April 12, 1949, Serial No. 87,103

4 Claims. (Cl. 121—70)

The present invention relates to certain improvements in gear motors or pumps which enhance the operating characteristics and which simplify the manufacture thereof.

In conventional gear-type motors or pumps it has been the common practice to provide a housing around the intermeshing gears which has a close fit around a major portion of the peripheries of the gears and thus the friction developed in such units is considerable, causing excessive wear of the gears and housing and excessive heating of said parts not to say anything about the low mechanical efficiency thereof. Of course, the aforesaid conventional gear units and particularly motors are open to the further objection that the fluid under pressure carried from the inlet port to the discharge port has the effect of urging the gears toward one another thereby causing a binding tendency and excessive friction. In attempts to cure these objectionable characteristics of conventional gear units it has been proposed to cut away portions of the housing to form chambers at those regions of the gears which are opposite the inlet and discharge ports and to provide passageways respectively leading from such chambers to the ports for the purpose of balancing the loads on the pilot shafts of the gears. While the intended purpose of balancing the loads on the pilot shafts has thus been accomplished there is yet objectionable frictional resistance to the free rotation of the gears occasioned by the fluid under pressure acting on the gears at the areas diametrically opposed to the high pressure port.

A still further objection to prior art gear motors is that the pressure inlet ports are generally so disposed that the fluid flowing therethrough impinges directly against the gears to impede rotation thereof.

Still another objection is that in a spur gear motor having its inlet port in the form of a cylindrical bore disposed axially of the gears, the intersection of such bore with the walls of the gear cavity in the housing comprises straight lines which are parallel to the axial straight line elements of the gear teeth whereby there is an abrupt cut-off of the high pressure fluid during the rotation of the gears.

Accordingly, one primary object of this invention is to eliminate the aforesaid and other objections to prior gear units by the provision of a gear housing which forms with the gears low pressure chambers extending around a major portion of the peripheries of the gears to thus reduce the radial thrust load on the gears or the pilot shafts of the gears to the small amount caused by the high pressure fluid acting on a minor portion of the peripheries of the gears.

Another object is to provide a gear unit in which the high pressure port is in the form of a relatively narrow slot having oppositely tapered side walls which are inclined relative to the axial straight line elements of the gear teeth.

Another object is to provide a gear unit of the character indicated in which a novel check valve arrangement renders the unit reversible while yet preserving all of the aforesaid features.

Another object is to provide a reversible gear unit of unusually high mechanical and volumetric efficiency and of a form which simplifies manufacture thereof.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
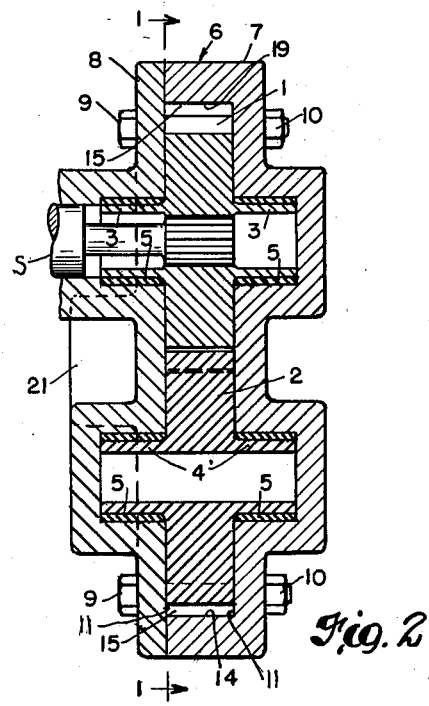
Figure 3:
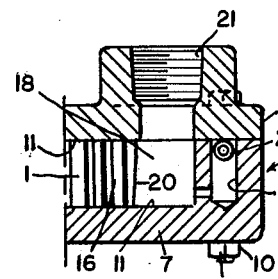
Figure 4:
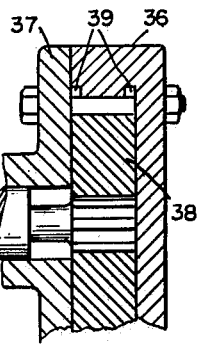
Figure 6:
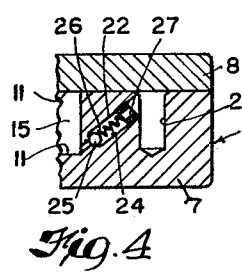
Figure 5:
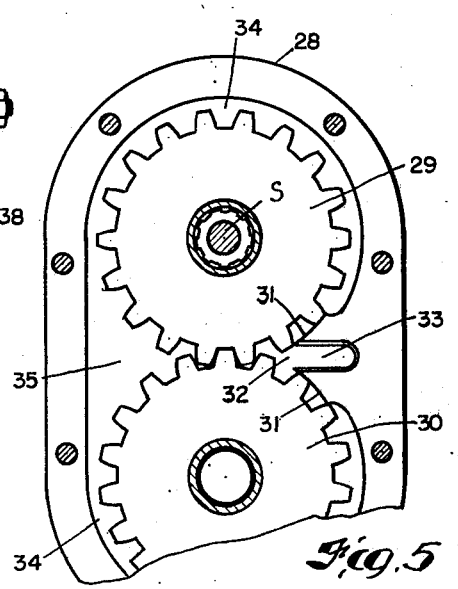

In said annexed drawing:

Fig. 1 is a cross-section view taken substantially along a plane indicated by the line 1—1, Fig. 2, coinciding with one of the side faces of the gears;

Figs. 2, 3, and 4 are cross-section views respectively taken substantially along the planes indicated by the lines 2—2, 3—3, and 4—4, Fig. 1;

Fig. 5 is a fragmentary cross-section view similar to Fig. 1 illustrating a modification; and Fig. 6 is a fragmentary cross-section view similar to Fig. 2 except illustrating a modification which dispenses with the necessity of providing pilot shafts on the gears.

Referring now to the drawing and first to the embodiment of the invention illustrated in Figs. 1-4, the gear unit shown comprises a pair of intermeshing spur gears 1 and 2 respectively provided with oppositely extending pilot shafts 3—3 and 4—4 freely rotatable in sleeve or like antifriction bearings 5, said bearings 5 being mounted in complementary recesses formed in the housing 6 which encloses said gears.

Said housing 6 comprises a body 7 and a cover plate 8 which are held together as by the bolts 9 and nuts 10 which are disposed around the peripheries of said body and cover plate. Said body 7 and cover plate 8 define between them a cavity comprising parallel walls 11 with which the opposite side faces of the gears 1 and 2 have a running fit, it being understood that in some instances it may be desirable to provide plates of bearing metal which are engaged by the side faces of the gears. Such cavity further comprises cylindrical wall portions 12 disposed on opposite sides of the point of gear intermesh in close proximity to the peripheries of the gears 1 and 2 and extending to points spaced circumferentially from the point of gear intermesh only a minor portion of the peripheries of the gears, viz. less than 60° in the illustrative embodiment of the invention, the remaining wall portions 14 of the cavity encircling and radially spaced from a major portion (240° or more) of the peripheries of the gears to provide, as will hereinafter appear, low pressure chambers 15 communicating with the discharge port of the unit. As indicated, the peripheries of the gears 1 and 2 have a running fit only with the cylindrical wall portions 12 whereby said gears divide the cavity in housing 6 into two chambers 16 disposed on opposite sides of the point of gear intermesh and extending only to the points 17 which are as close as practicable to the point of gear intermesh and into two chambers 15 each of which is disposed between the chambers 16 and encircles a major portion of the periphery of one of the gears. Extending through the cover plate 8 is a shaft S having a splined connection with the gear.

Leading into the cavity on opposite sides of the point of gear intermesh and in the middle of the wall portions 12 aforesaid are a pair of ports 18 each of which is in the form of a relatively narrow slot which leaves only enough of the adjacent cylindrical wall portions 12 on opposite sides so that the latter extend along the peripheries of the gears 1 and 2 a distance substantially equal or only slightly more than the space between adjacent teeth of the gears. It is to be noted that the ports 18 have oppositely tapered side walls 19 which intersect the cylindrical wall portions 12 along lines 20 which are inclined relative to the axial straight line elements of the spur gear teeth as best shown in Fig. 3 whereby to provide a progressive trapping of fluid in the space between adjacent teeth of each gear as said gears are driven. As shown, the cover plate 8 is formed with a pair of threaded ports 21 respectively communicating with the aforesaid ports or slots 18.

Associated with each of the ports 18 are two check valve assemblies 22 which permit one-way flow from the low pressure chambers 15 to the chamber 16 by way of a bore 23 which is common to the outlet ends of each pair of check valves 22 and a counterbored passage 24 which leads from the respective chamber 15 to said bore 23 and thence to said chamber 16. The check valves 22 as herein illustrated each comprise a ball 25 seated in such counterbored passage 24, a relatively light spring 26 compressed between said ball and a plug 27 in such passage, whereby to normally retain the ball in a seated position.

From the foregoing it is evident that when there is fluid under pressure in either of the ports 18 and its chamber 16, the associated pair of check valves 22 will be held in a seated position while the fluid carried by the rotation of the gears 1 and 2 to or from the low pressure chambers 15 (depending upon whether the unit is operated as a motor or pump) will effect unseating of the other pair of check valves 22 to discharge the fluid through the other port 18 and thereby maintain the chambers 15 as well as the other chamber 16 at a low pressure.

As apparent, when the unit is operated as a motor, fluid under pressure in entering the said one port 18 will impinge against the bottom wall of the port and thus will not tend to impede driving of the gears.

Likewise, because the fluid under pressure only acts on a relatively small area of the gears between the point of gear intermesh and the points 17, the radial thrust on the pilot shafts 3—3 and 4—4 of the gears 1 and 2 does not objectionably reduce the mechanical efficiency of the unit. Moreover, because the high pressure fluid acts only on such small areas, the friction between the gears 1 and 2 and the housing 6 is maintained at a minimum and without any tendency of mashing the gears together.

The modification illustrated in Fig. 5 is essentially the same as that illustrated in Fig. 1 except that the cylindrical wall portions 12 on one side of the point of gear intermesh and the check valves 22 have been omitted. Thus, the unit comprises a housing 28 formed with a cavity which is divided by the gears 29 and 30 which are in close proximity to the cylindrical wall portions 31 into a high pressure chamber 32 and port 33 preferably the same as port 18 leading thereto and a low pressure chamber 34 extending from the wall portions 31 around a major portion of the peripheries of the gears to the point of gear intermesh. Omission of the cylindrical wall portions as aforesaid and of the check valves 22 renders the unit of Fig. 5 non-reversible whereby fluid under pressure should be present only in the port 33 in order to realize to full extent the advantages of the present invention. The cover plate is preferably the same as cover plate 8 whereby one port 21 will lead to the port 33 and the other port 21 will lead to the space designated by the numeral 35.

A still further modification illustrated in Fig. 6 comprises a body 36 and cover plate 37 forming a cavity therebetween to receive a pair of intermeshing gears 38, one of which is shown in Fig. 6. In this form of the invention, the cavity in said housing will be in close proximity with the gears around most of the periphery of the gears whereby to eliminate the necessity of providing pilot shafts on the latter. For the purpose of reducing the pressure of the fluid around such major portion of the periphery of the gears the wall is formed with one or more circumferentially extending grooves 39 which extend between the points 17 around the respective gears. Otherwise, the general operating characteristics and principal features of novelty are the same as in the Figs. 1 to 5 constructions.

Other modes of applying the principle of the invention may be employed, change being made as regards the details described, provided the features stated in any of the following claims, or the equivalent of such, be employed.

I therefore particularly point out and distinctly claim as my invention:

1. In a gear unit, a housing formed with a cavity therein, a pair of intermeshing gears rotatable in such cavity and dividing the latter into two chambers each on opposite sides of the point of gear intermesh and extending around a minor portion of the periphery of said gears and two other chambers each disposed between such first-named chambers and extending around a major portion of the periphery of the respective gear, said housing being formed with a pair of ports respectively leading to such first-named chambers and with passages leading from each port to both of such other chambers, and check valves in such passages arranged to permit flow of fluid from such other chambers to said ports.

2. In a gear unit, a housing formed with a cavity therein, a pair of intermeshing gears rotatable in such cavity and dividing the latter into two chambers each on opposite sides of the point of gear intermesh and extending around a minor portion of the periphery of said gears and two other chambers each disposed between such first-named chambers and extending around a major portion of the periphery of the respective gear, said housing being formed with a pair of ports respectively leading to such first-named chambers and with passages leading from each port to both of such other chambers, and check valves in such passages arranged to permit flow of fluid from such other chambers to said ports, each of said ports being in the form of a relatively narrow slot across the width of the face of said gears which opens into the respective chamber opposite the point of gear intermesh.

3. In a gear unit, a housing formed with a cavity therein, a pair of intermeshing gears rotatable in such cavity and dividing the latter into two chambers each on opposite sides of the point of gear intermesh and extending around a minor portion of the periphery of said gears and two other chambers each disposed between such first-named chambers and extending around a major portion of the periphery of the respective gear, said housing being formed with a pair of ports respectively leading to such first-named chambers and with passages leading from each port to both of such other chambers, and check valves in such passages arranged to permit flow of fluid from such other chambers to said ports, each of said ports being in the form of a relatively narrow axially disposed slot which opens laterally into the respective chamber opposite the point of gear intermesh.

4. In a gear motor, a housing formed with a cavity therein, a pair of intermeshing spur gears rotatable in such cavity and dividing the latter into two chambers each on opposite sides of the point of gear intermesh and extending around a minor portion of the periphery of said gears and two other chambers each disposed between such first-named chambers and extending around a major portion of the periphery of the respective gear, said housing being formed with a pair of ports respectively leading to such first-named chambers and with passages leading from each port to both of such other chambers, and check valves in such passages arranged to permit flow of fluid from such other chambers to said ports, each of said ports being in the form of a relatively narrow slot which opens into the respective chamber opposite the point of gear intermesh and which has tapered opposite side walls terminating at the periphery of said gears in lines inclined with respect to the axial straight line elements of the gear teeth.

JAMES P. JOHNSON.

References Cited in the file of this patent

UNITED STATES PATENTS

| Number | Name | Date |
|---|---|---|
| 345,969 | Harrold | July 20, 1886 |
| 1,105,312 | Sundh | July 28, 1914 |
| 1,129,090 | Hawley | Feb. 23, 1915 |
| 1,148,809 | White | Aug. 3, 1915 |
| 1,634,023 | Davison | June 28, 1927 |
| 1,673,262 | Meston et al. | June 12, 1928 |
| 1,891,793 | Kauffman | Dec. 20, 1932 |
| 2,105,259 | Oshei | Jan. 11, 1938 |
| 2,146,395 | Horton | Feb. 7, 1939 |
| 2,147,777 | Oshei | Feb. 21, 1939 |
| 2,211,154 | Oshei | Aug. 13, 1940 |
| 2,252,661 | Oshei | Aug. 12, 1941 |

FOREIGN PATENTS

| Number | Country | Date |
|---|---|---|
| 95,884 | Switzerland | Aug. 16, 1922 |
| 622,180 | France | May 24, 1927 |
| 672,256 | France | Dec. 26, 1929 |